UNITED STATES PATENT OFFICE.

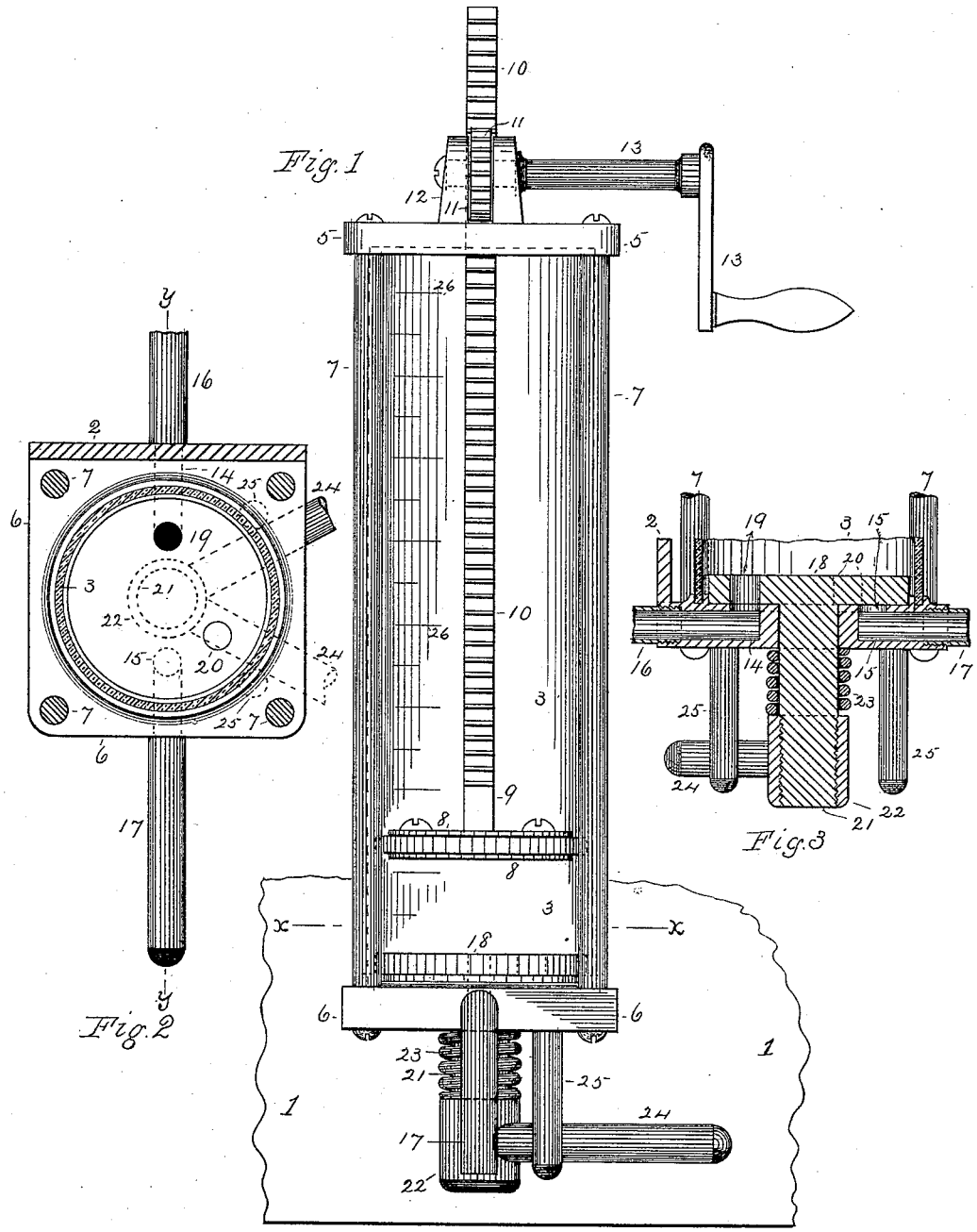

CLARK ROBINSON, OF HARTLEY, IOWA, ASSIGNOR OF TWO-THIRDS TO W. S. FULLER, J. M. YEOMAN, J. W. CRAVENS, AND FRANK PATCH, OF SAME PLACE.

MEASURING-VESSEL.

SPECIFICATION forming part of Letters Patent No. 429,201, dated June 3, 1890.

Application filed October 18, 1889. Serial No. 327,471. (No model.)

*To all whom it may concern:*

Be it known that I, CLARK ROBINSON, of the town Hartley, in the county of O'Brien and State of Iowa, have invented certain new and useful Improvements in Measuring-Faucets, of which the following is a specification.

My invention relates to devices for drawing and measuring liquids; and the object of the invention is the production of a device adapted to draw off, measure, and discharge variable quantities of liquid.

The invention consists, essentially, in a graduated glass cylinder provided with a piston for filling and discharging it, and having induction and eduction ports at its base controlled by a revolving disk having openings arranged to open the one while closing the other port.

My improvements are illustrated in the accompanying drawings, in which Figure 1 is a front elevation of a measuring-faucet containing the improvements. Fig. 2 is a transverse section on the line $x$ $x$ of Fig. 1, showing the lower portion of the devices; and Fig. 3 is a vertical section of the lower portion on the line $y$ $y$ of Fig. 2.

In said drawings, 1 designates a tank or vessel of any character from which it is designed to draw off liquid, and 2 brackets or other devices by which the faucet is attached to the vessel.

3 designates a glass cylinder supported in a frame consisting of a top plate 5 and a base-plate 6, connected by posts 7. Within the cylinder is a piston 8, of any suitable material, fitted tightly within the cylinder. The piston-rod 9 is formed into a rack 10, which is engaged by a pinion 11 for raising and lowering the piston. The pinion is mounted in a support 12, that is secured on the top plate 5, and a crank-handle 13 is provided for turning the pinion in either direction. In the base 6 are provided openings 14 and 15, the former being in communication with an inlet-pipe 16, that is inserted in the vessel from which water is to be drawn, and the latter 15 is in communication with a discharge-pipe 17. These openings 14 and 15 extend laterally from opposite sides of the base-plate to points within the circle of the glass cylinder, and thence extend upward through the base. On the base-piece and within the cylinder is a disk 18, having openings 19 and 20 arranged to be alternately presented to the inlet and outlet openings to establish communication between the same and the chamber of the cylinder. The disk 18 is carried on a stem 21, that extends downward through the base and is screw-threaded at its end to receive a nut 22. Between the nut and the base is a spiral spring 23, that exerts expansive force against the nut and base 6, thus holding the disk tightly to the base on which it is seated. The disk is made to fit water-tight upon the base, so that there can be no passage of fluid except through the ports. A handle 24, provided on the nut, enables the disk to be turned so as to bring the inlet-ports 14 and 16 in conjunction when the handle is turned to its limit in one direction, and when returned to the opposite limit serves to bring the exit-openings 15 and 17 in conjunction. The oscillation of the handle is limited by stops 25, so that the disk will be brought into proper position with each movement of the handle.

In operation, when it is designed to draw off liquid, the handle 24 is turned to position to open the inlet-ports, the crank 13 is turned to elevate the piston, and the suction produced thereby serves to draw in liquid through the inlet-ports to fill the chamber of the cylinder below the piston. As a means of determining the quantity of liquid in the cylinder, the cylinder itself may be provided with graduations 26, or the graduations may be on a plate attached to one of the posts. When the desired quantity of liquid has been drawn into the cylinder, the handle 24 is turned to establish communication between the discharge-openings, and the crank is then operated in reverse direction to depress the piston and force the liquid through the eduction-ports.

The device may be used in connection with liquid tanks, barrels, or other vessels, either by being attached directly to such vessel or by being placed in any convenient position with an inlet-pipe connecting them.

Having described my invention, what I claim is—

1. In a measuring-faucet, in combination, a glass barrel and graduations whereby the quantity of liquid contained may be seen through the barrel, a piston and piston-rod, and means for operating them to suck liquid into the barrel and eject it, heads for the barrel and posts connecting them, induction and eduction ports provided in the lower head, a gate fitting water-tight thereon, a stem projecting from the gate beneath the head, a handle thereon for turning it, and a spring for holding the head to the gate, substantially as set forth.

2. In a measuring-faucet, the combination, with a graduated glass cylinder, of a piston, a piston-rod providing a rack-bar, a pinion and handle for operating the same, a base-plate provided with a lateral induction and an opposite eduction port, a rotating disk fitting water-tight thereon provided with inlet and outlet openings, a stem therefor extending through the base-plate, a nut and handle thereon for turning the disk, and a spring between the nut and the base-plate, substantially as set forth.

CLARK ROBINSON.

Witnesses:
P. H. GUNCKEL,
E. M. SCHUMANN.